United States Patent [19]
Ohta et al.

[11] Patent Number: 5,768,410
[45] Date of Patent: Jun. 16, 1998

[54] IMAGE PROCESSING APPARATUS AND METHOD

[75] Inventors: Kenichi Ohta, Kawasaki; Takashi Yabe, Yokohama, both of Japan

[73] Assignee: Canon Kabushiki Kaisha, Tokyo, Japan

[21] Appl. No.: 854,725

[22] Filed: May 12, 1997

Related U.S. Application Data

[63] Continuation of Ser. No. 361,656, Dec. 22, 1994, abandoned.

[30] Foreign Application Priority Data

Dec. 27, 1993 [JP] Japan ................. 5-331872

[51] Int. Cl.$^6$ ....................... G03F 3/08
[52] U.S. Cl. ............ 382/162; 358/523; 358/525; 358/518; 395/131
[58] Field of Search ................ 358/506, 501, 358/518, 520, 521, 522, 523, 524, 525; 395/129, 131; 382/162, 157; G03F 3/08

[56] References Cited

U.S. PATENT DOCUMENTS

| | | |
|---|---|---|
| 4,334,240 | 6/1982 | Franklin ................. 358/525 |
| 4,488,245 | 12/1984 | Dalke et al. ............. 358/518 |
| 5,126,838 | 6/1992 | Ohsawa et al. ........... 358/75 |
| 5,130,819 | 7/1992 | Ohta ..................... 358/445 |
| 5,264,927 | 11/1993 | Miyoshi et al. .......... 358/500 |
| 5,363,218 | 11/1994 | Hoshino ................. 358/501 |
| 5,475,510 | 12/1995 | Ikegami ................. 358/523 |

*Primary Examiner*—Thomas L. Stoll
*Attorney, Agent, or Firm*—Fitzpatrick, Cella, Harper & Scinto

[57] ABSTRACT

A color signal processing apparatus which is capable of providing satisfactory operation accuracy while keeping the memory size relatively small. A dividing circuit divides three input signals R, G, and B into upper bit data and lower bit data. A first table memory stores output values for all combinations of the three upper bit signals, the upper bit data of the three input signals being accepted as address signals and a first output value being provided. A second table memory stores the output values for all combinations of signal values obtained by adding a prescribed offset (e.g. $2^{NL}/2$) to a signal value which is expressed by upper bits, upper bit data of the three input signals being accepted as address signals and a second output value being provided. An interpolation circuit outputs a final output signal in accordance with the output value of the first table memory, the output value of the second table memory and the lower bit data.

11 Claims, 10 Drawing Sheets

○ : FIRST MEMORY ADDRESS
● : SECOND MEMORY ADDRESS

IMAGE PROCESSING APPARATUS AND METHOD

This application is a continuation of application Ser. No. 08/361,656 filed Dec. 22, 1994, now abandoned.

BACKGROUND OF THE INVENTION

1. Field of the Invention

The present invention relates to a color image processing apparatus and method which convert input color signals by an interpolating operation based on a table.

2. Related Background Art

A conventional color signal processing apparatus is shown in FIG. 10. This color signal processing apparatus is designed to resolve an original image into three colors, namely, red, green, and blue (R, G, and B) and convert them into cyan, magenta, and yellow (C, M, and Y) signals which are the three primary colors of a subtractive mixture, and then print them out using an ink-jet printer, thereby producing a color duplicate image.

Output color signals, C, M, and Y are individually generated from the input three primary color signals, R, G, and B through signal processing circuits 101, 102, and 103 shown in FIG. 10.

For instance, to generate the C, M, and Y signals from the R, G, and B signals, the signal processing circuits 101, 102, and 103 execute "masking operation" represented by an expressions given below:

$$C = A_{11} \times R + A_{12} \times G + A_{13} \times B$$

$$M = A_{11} \times R + A_{22} \times G + A_{23} \times B$$

$$Y = A_{31} \times R + A_{32} \times G + A_{33} \times B$$

where $A_{ij}$ is a coefficient which is determined in accordance with the characteristics of an output device.

Another conventional example is based on a "look up in table" method. According to this method, rather than performing the arithmetic operation for determining the sums of products by the signal processing circuits 101, 102, and 103 as shown above, the arithmetic operation results are stored beforehand in a table memory, so that the arithmetic operation results for the respective R, G, and B signal values entered are read from the table and output. In this case, however, assuming that each input color signal is expressed by 8 bits, a storage area of $2^{24}$ addresses, i.e., more than 16 million addresses would be required, which is unfeasible.

Still another conventional example shown in FIG. 11 has been proposed. In this example, the input R, G, and B signals are divided into upper bit data 111 and lower bit data 112, and only the operation results of the upper bits are stored in a table memory 113. An output value 114 for the upper bit data is subjected to linear interpolation (115) based on the lower bit data 112, thus determining a final output signal 116. In this way, the storage area of the table memory 113 only has to hold the addresses required for the number of upper bits. For example, if each color uses 3 bits for the upper bits, then the storage area has to provide only 29 addresses, i.e., 512 addresses, thus permitting a significant reduction in the required storage area.

In the conventional example described above, the color signal processing apparatus which combines the table memory 113 and the interpolation circuit 115 is advantageous in that complicated nonlinear conversion can be implemented relatively easily. This apparatus, however, unavoidably produces an interpolation error because it is designed to determine an output signal by linear interpolation carried out on an input signal among stored data.

The interpolation error stated above would be most effectively minimized by increasing the number of bits taken as the upper bits; however, adding 1 bit means that the storage area of the table memory needs to be expanded by 23 times, i.e., 8 times, for accommodating the three inputs (R, G, and B). Accordingly, the conversion accuracy and the size of the storage area inevitably presents a trade-off relationship problem; in order to control the amount of memory, i.e. the storage capacity, the number of bits must be set at the sacrifice of the conversion accuracy to a certain extent.

SUMMARY OF THE INVENTION

Accordingly, an object of the present invention is to provide an image processing apparatus and method which enable satisfactory operation accuracy to be obtained while being a relatively small amount of memory.

Another object of the present invention is to provide an image processing apparatus and method which ensures good interpolation accuracy for achromatic colors.

According to a preferred embodiment of the present invention with such objects, an image processing apparatus is disclosed, which apparatus has an input means for entering image data and a color processing means for implementing color processing on the aforesaid entered image data by referring to a table which stores typical values; the aforesaid color processing means comprising: a reading means which reads, from the aforesaid table, typical values corresponding to the respective vertexes of a quadrangular pyramid where the entered image data exists; and an interpolating operation means which carries out an interpolation operation according to the aforesaid typical values.

These and other objects, features, and advantages of the present invention will become clear from the following description of the preferred embodiments taken in conjunction with the accompanying drawings.

DESCRIPTION OF THE PREFERRED EMBODIMENTS

The following is a detailed description of the embodiments of the present invention with reference to the accompanying drawings.

(First Embodiment)

Figure 1:
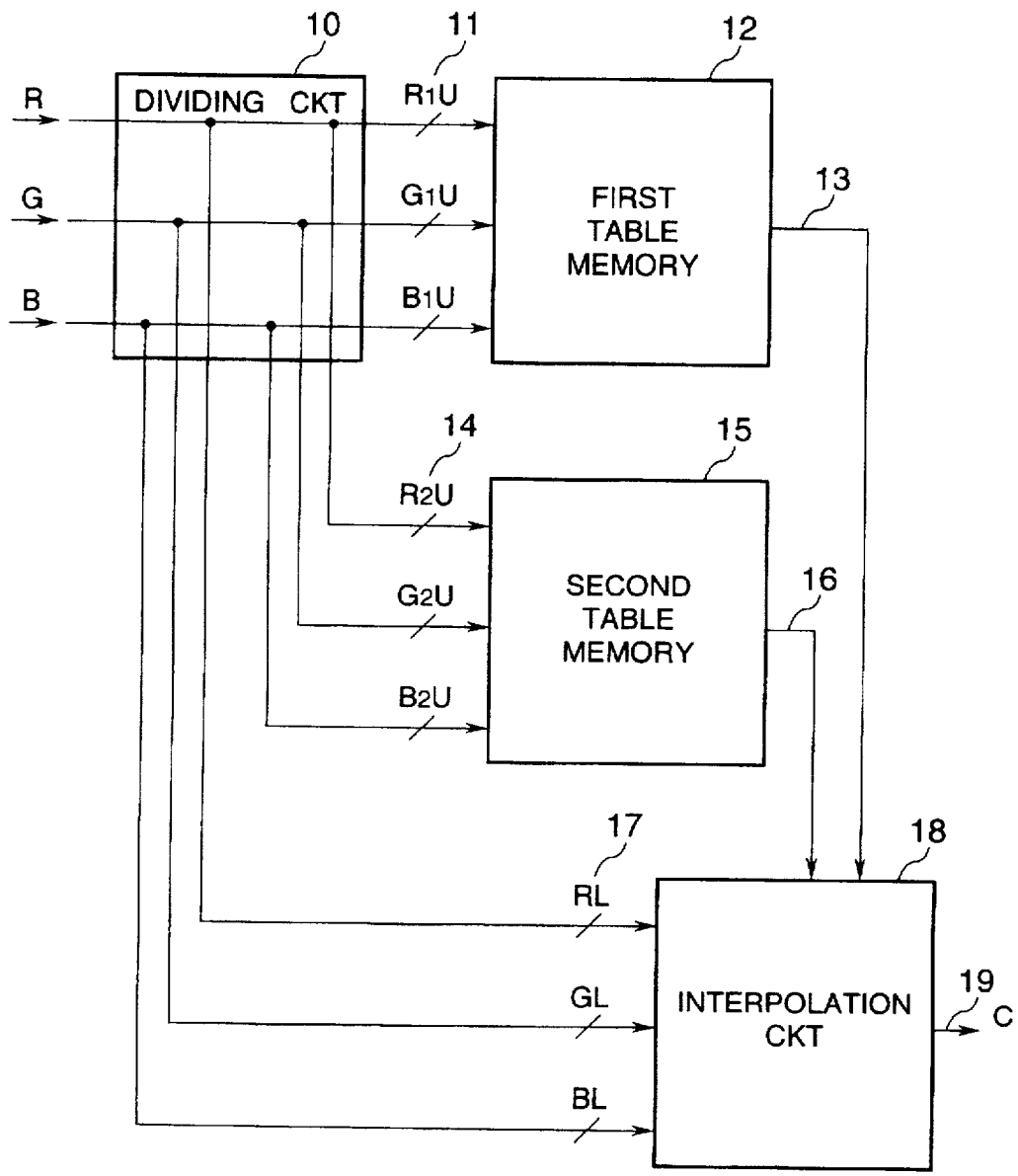
FIG. 1 is a block diagram illustrative a circuit configuration of a color signal processing apparatus of a first embodiment in accordance with the present invention.

FIG. 1 is a circuit configuration of a color signal processing apparatus of the first embodiment of the present invention. This figure shows a case where an output signal C is provided in response to three (R, G, and B) input signals. A dividing circuit 10 generates, based on the R, G, and B input signals, the signals for controlling the addresses in a first table memory 12 and a second table memory 15 and the address signals used for performing the interpolation operation through an interpolation circuit 18 under the control of a CPU (not shown). Reference numeral 11 denotes the address signals which are generated in accordance with the upper bits of the three (R, G, B) input signals and which are entered in the first table memory 12, a first output value 13 stored in the first table memory 12 being read out. Like the reference numeral 11, reference numeral 14 also denotes the address signals which are generated according to the upper bit signals of the three (R, G, B) input signals and which are entered in the second table memory 15, a second output value 16 stored in the second table memory 15 being read out. Reference numeral 17 denotes lower bit signals of the three (R, G, B) input signals which are supplied to the interpolation circuit 18. The interpolation circuit 18 carries out the linear interpolation operation, which will be discussed later, in accordance with the first output value 13, the second output value 16, and the lower bit data (signal) 17 so as to output a final output signal 19.

The aforesaid first and second table memories 12 and 15 will now be described.

It is assumed that the relationship between the input signals R, G, and B (red, green, and blue) and the final output signal C (cyan) is defined by an expression (1) given below with a function F:

$$C = F(R, G, B) \quad (1)$$

Further, the input signals R, G, and B are divided into upper bit data RU, GU, and BU, and lower bit data RL, GL, and BL as shown by an expression (2) below. The number of input signal bits is denoted by Ni, the number of upper bits is denoted by NU, and the number of lower bits is denoted by NL (Ni=NU+NL).

$$R = RU \times 2^{NL} + RL \quad G = GU \times 2^{NL} + GL \quad B = BU \times 2^{NL} + BL \quad (2)$$

The above expressions can be conversely written as:

$$RU = R/2^{NL}$$

$$GU = G/2^{NL}$$

$$BU = B/2^{NL}$$

$$RL = R - RU \times 2^{NL}$$

$$GL = G - GU \times 2^{NL}$$

$$BL = B - BU \times 2^{NL}$$

Figure 2:
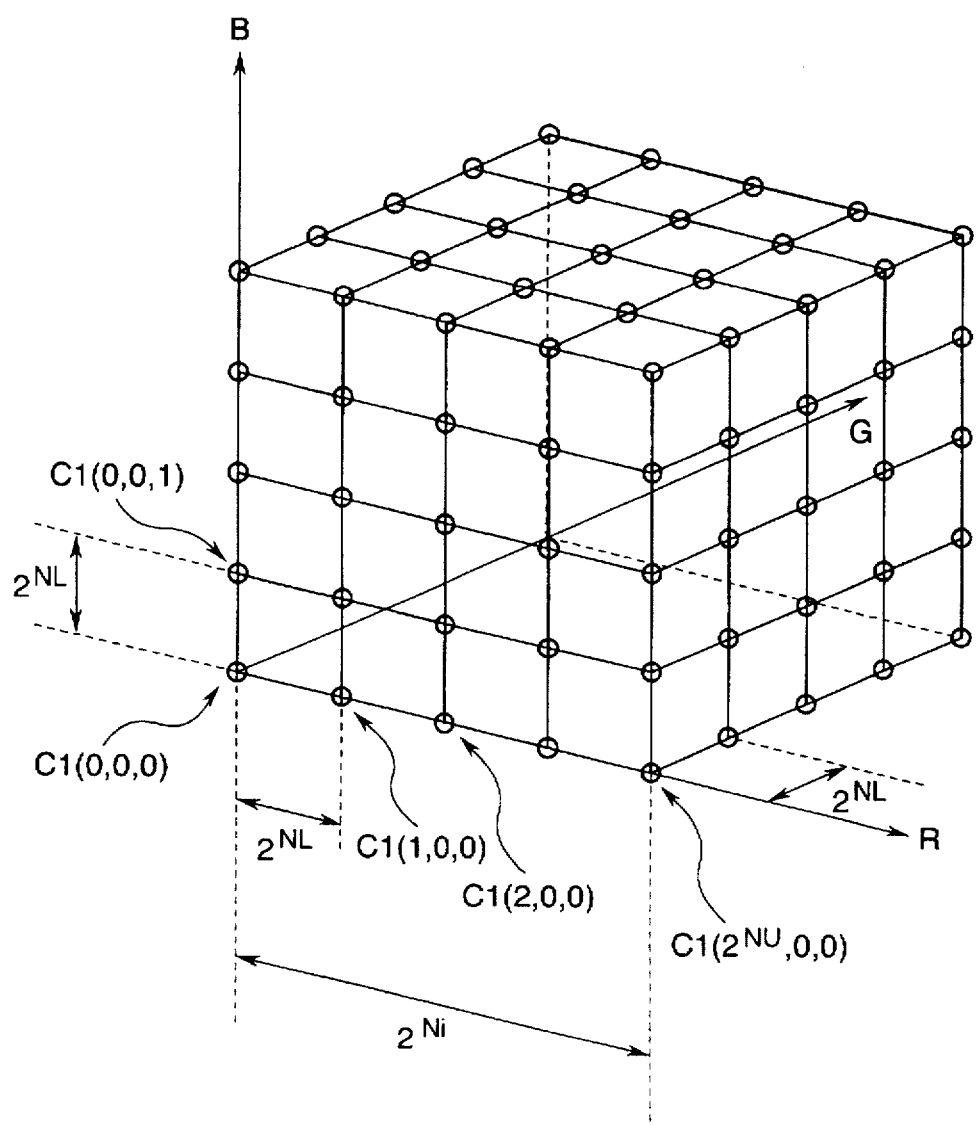
FIG. 2 is a diagram illustrating the lattice points of a first memory of FIG. 1 according to upper bit data.

Written in the first table memory 12 are the output values for all combinations of the upper bits of the respective R, G, and B signals, that is, the function values shown in expression (1) for all the R, G, and B input signals wherein the lower bit data is 0, as shown in FIG. 2. Specifically, a space, wherein an input signal is present, is indicated by a group of unit cubes, one side thereof being $2^{NL}$. The output values for the respective vertexes of the unit cubes are stored in the first table memory 12 as typical values. If the output value is denoted by C1 (i, j, k), then $$C1(i, j, k) = F(i \times 2^{NL}, j \times 2^{NL}, k \times 2^{NL}) \quad (3)$$

where i,j,k are all integers from 0 to $2^{NU}$

As it is obvious from expression (3), a storage area of $(2^{NU}+1)^3$ addresses (e.g. 729 addresses when NU=3) is required for the first table memory 12.

As shown in FIG. 2, the data represented by expression (3) has C1 written on the lattice points arranged equidistantly in steps of $2^{NL}$ of an input signal value, i.e., written on the vertexes of the unit cubes when it is observed in terms of the three-dimensional space of R, G, and B.

Figure 3:
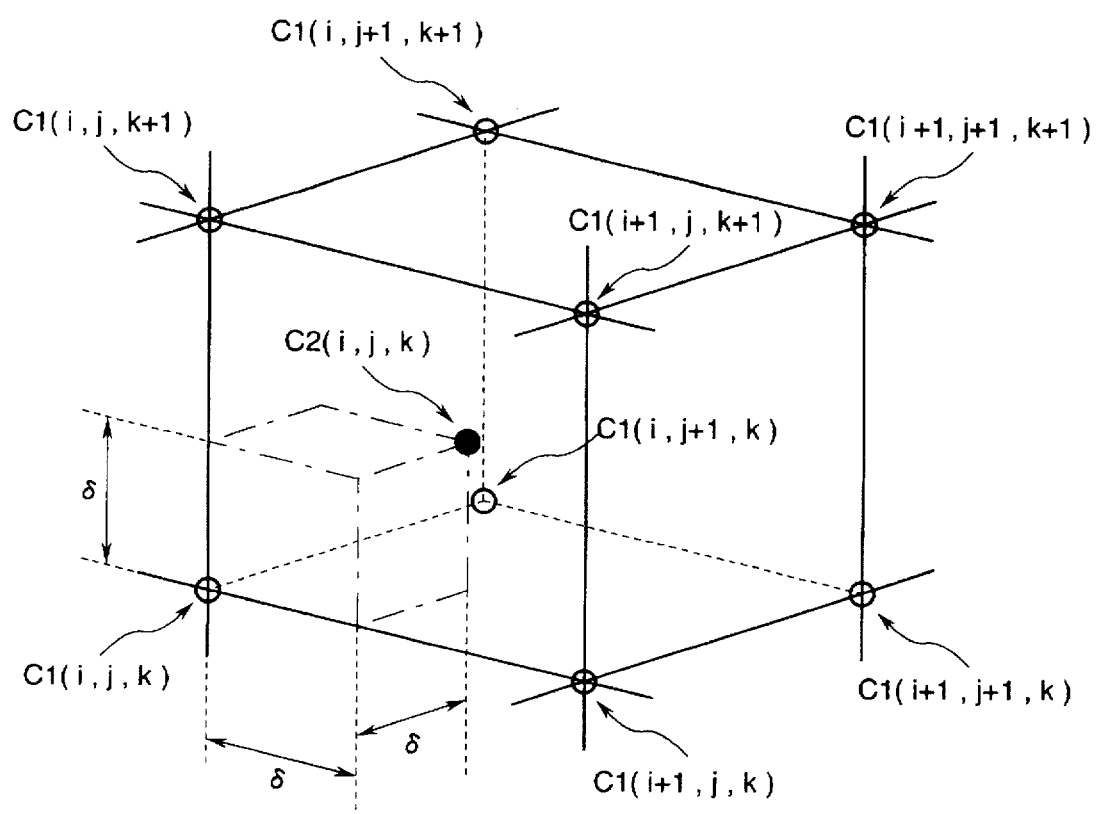
FIG. 3 is a diagram illustrative of the data of a second memory of FIG. 1 inside the lattice points of FIG. 2.

As shown in FIG. 3, stored in the second table memory 15 is data C2 which is represented by points located between the aforesaid lattice points shown in FIG. 2.

Specifically, an aggregate of data C2 forms a group of unit cubes just like the group of unit cubes stored in the first table memory 12 although it has a different size, that is, a different number of lattice points and different locations of lattice points.

Function value C2 given by expression (4) shown below is stored in the second table memory 15, an offset value being denoted as δ:

$$C2(i, j, k) = F(i \times 2^{NL} + \delta, j \times 2^{NL} + \delta, k \times 2^{NL} + \delta) \quad (4)$$

where i,j,f are all integers from 0 to $2^{NU} - 1$

The value of δ must be set so that C2 is located inside the lattice points given by expression (3). Theoretically, any value may be set for δ as long as the following condition is satisfied:

$$0 < \delta < 2^{NL} \quad (5)$$

The value of δ is, however, set to the one given by the following expression (6) to simplify the selection of lattice points, which will be discussed later.

$$\delta = 2^{NL}/2 \quad (6)$$

As it is obvious from expression (4), the storage area necessary for the second table memory 12 is $(2^{NU})^3$ addresses (e.g. 512 addresses when NU=3).

If the value of δ is set to $2^{NL}/2$ as shown in expression (6), then C2 will include a value which indicates an achromatic color. This makes it possible to increase the number of lattice points on the main diagonal line (achromatic axis) which passes C1 (0, 0, 0) of the group of the unit cubes existing in the RGB color space shown in FIG. 2. Hence, the interpolation accuracy for achromatic colors can be increased.

A final output signal 19 of C is determined through the interpolation circuit 18 according to the contents of the first table memory 12 and the second table memory 15 thus prepared. The data interpolation method used for this purpose will be explained, referring to FIG. 4.

The input signals R, G, and B are divided into the upper bit data and the lower bit data through the dividing circuit 10 according to expression (2). Then, address signals corresponding to the respective table memories, which are created based on the upper bit data, are generated. The lower bit data is applied to the interpolation circuit 18. Four neighboring lattice point data C11 to C14, which are closest to the input value of R, G, and B, are read from the first table memory 12. These pieces of data are the ones written as the data on the four vertexes of a surface which is closest to the input RGB signal as shown by the white dots in FIG. 4. As the surface closest to the input signal, one of the six surfaces surrounding the input signal is selected by obtaining the distances between the input signal value and the six surfaces; the surface with the shortest distance is selected.

Figure 4:
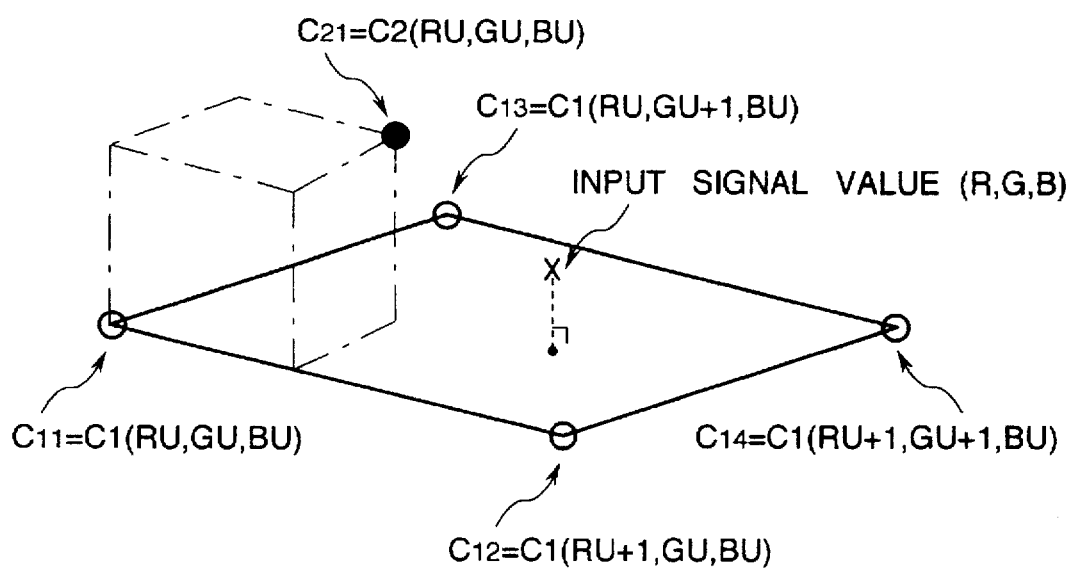
FIG. 4 is a diagram showing the relationship between an input signal and the first and second memories mentioned above.

For example, if the surface closest to the input signal is the one shown in FIG. 4, then C11 to C14 can be represented as shown below by applying the upper bit data of R, G, and B to expression (3).

$$C11=C1(RU, GU, BU)$$

$$C12=C1(RU+1, GU, BU)$$

$$C13=C1(RU, GU+1, BU)$$

$$C14=C1(RU+1, GU+1, BU) \quad (7)$$

It is impossible to read all of C11 to C14 at the same time; therefore, they may be read in time series, or four identical table memories may be prepared so that they can be read in parallel.

Then, lattice point data C21 closest to the input RGB signal is read from the second table memory 15. Data C21, which is indicated by a black dot in FIG. 4, can be represented as shown below by applying expression (4):

$$C21=C2 (RU, GU, BU) \quad (8)$$

Figure 5A:
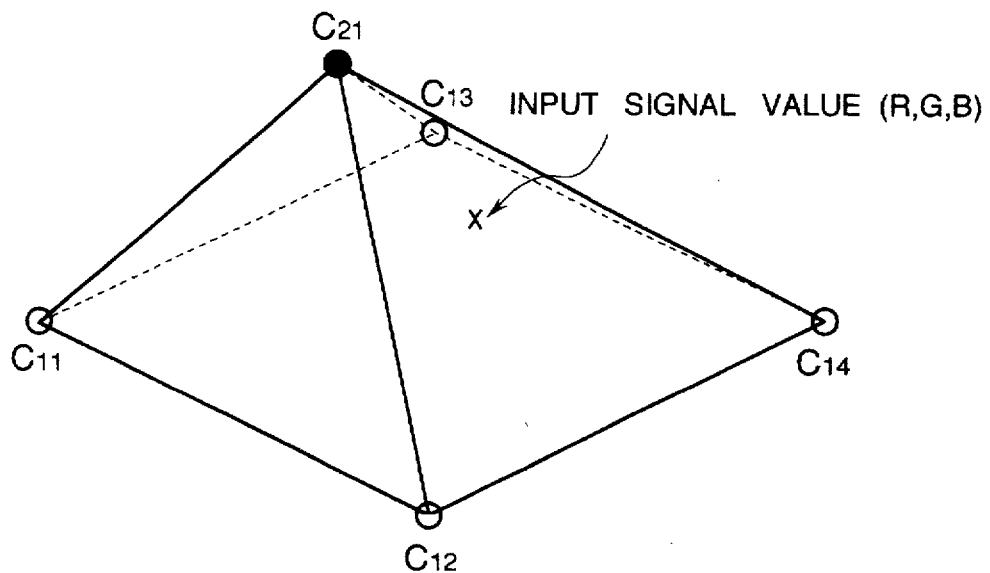
FIGS. 5A and 5B are diagrams illustrating quadrangular pyramids constituted by the aforesaid first and second memories.
Figure 5B:
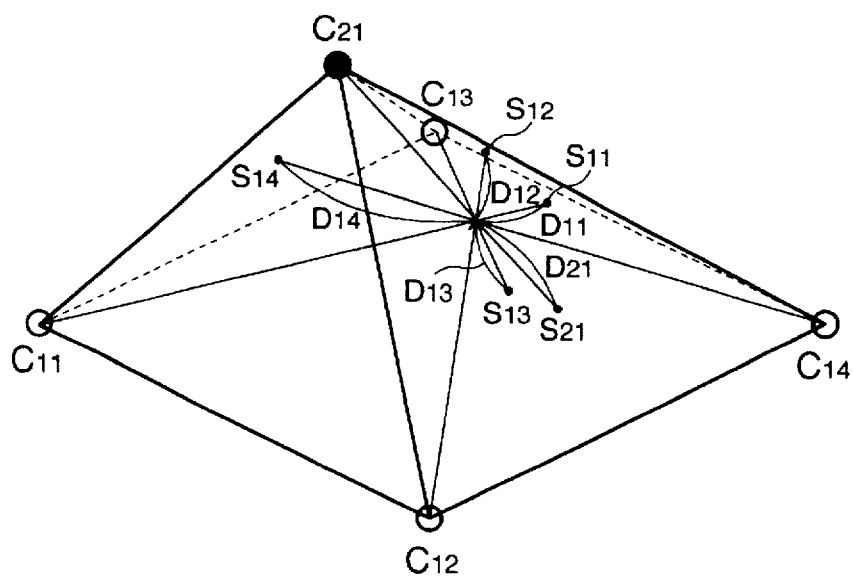

A total of five pieces of lattice point data can be obtained by following the procedures described above. Since the value of $\delta$ has been determined as shown by expression (6), the input RGB signal value is located inside the quadrangular pyramid which is formed by the five points, namely, C11 to C14 and C21, as illustrated in FIG. 5A. Accordingly, by determining the aforesaid five points and points $S_{11}$ to $S_{14}$ and $S_{21}$ at which straight lines passing the input signal value intersect with the respective five points on the surfaces of a quadrangular pyramid on the opposite side as illustrated in FIG. 5B, then by determining distances D11 to D14 and D21, which are the distances between points $S_{11}$ to $S_{14}$ and $S_{21}$ and the input signal value, the final output signal C can be obtained by performing the interpolating operation according to the following expression wherein lattice point data Cij is weighted by a determined distance Dij.

$$C=(D11 \times C11+D12 \times C12+D13 \times C13+D14 \times C14+D21 \times C21) \div (D11+D12+D13+D14+D21) \quad (9)$$

Thus, according to this embodiment, the interpolation accuracy can be improved without causing a significant increase in the amount of memory.

Furthermore, the interpolation accuracy especially in processing achromatic colors can be improved by setting $\delta$ to $2^{NL}/2$.

(Second Embodiment)

A color signal processing apparatus according to the second embodiment of the present invention which uses a different interpolation method from the one used in the first embodiment of the present invention stated above will now be described with reference to the block diagram given in FIG. 6. To simplify the explanation, the description will be given to a case where the offset value is set to $\delta=2^{NL}/2$.

The input signals of R, G, and B are divided into upper bits (RU, GU, and BU) and lower bits (RL, GL, and BL) by the upper/lower dividing unit 61. Read from the first table memories 68 to 71 are four neighboring lattice point data C11 to C14 closest to the input signal of R, G, and B. To determine the four neighboring lattice point data C11 to C14 closest to the input signal of R, G, and B, the appropriate quadrangular pyramid is selected by determining, through a min. value detection unit 62 shown in FIG. 6, minimum values (MINL) of six bits, RL, GL, BL, $2^{NL}-RL$, $2^{NL}-GL$, and $2^{NL}-BL$, which are obtained by the lower bits. Then, four first memory addresses are selected according to a selecting signal (Sel) of the quadrangular pyramid, referring to Table 1 given below. In this case, $2^{NL}$ denotes the number of the minimum distinguishable signal levels of upper bit data among the signal level steps in which an input signal value can be expressed; it indicates the interval between lattice points shown in FIG. 2.

[TABLE 1]

| Min. Value | Quadrangular Pyramid | First Memory Cl (i, j, k) | | |
|---|---|---|---|---|
| | | i | j | k |
| RL | Sel1 | RU | GU | BU |
| | | RU | GU + 1 | BU |
| | | RU | GU | BU + 1 |
| | | RU | GU + 1 | BU + 1 |
| $2^{NL}$-RL | Sel2 | RU + 1 | GU | BU |
| | | RU + 1 | GU + 1 | BU |
| | | RU + 1 | GU | BU + 1 |
| | | RU + 1 | GU + 1 | BU + 1 |
| GL | Sel3 | RU | GU | BU |
| | | RU + 1 | GU | BU |
| | | RU | GU | BU + 1 |
| | | RU + 1 | GU | BU + 1 |
| $2^{NL}$-GL | Sel4 | RU | GU + 1 | BU |
| | | RU + 1 | GU + 1 | BU |
| | | RU | GU + 1 | BU + 1 |
| | | RU + 1 | GU + 1 | BU + 1 |
| BL | Sel5 | RU | GU | BU |
| | | RU + 1 | GU | BU |
| | | RU | GU + 1 | BU |
| | | RU + 1 | BU + 1 | BU |
| $2^{NL}$-BL | Sel6 | RU | GU | BU + 1 |
| | | RU + 1 | GU | BU + 1 |
| | | RU | GU + 1 | BU + 1 |
| | | RU + 1 | GU + 1 | BU + 1 |

Figure 7:
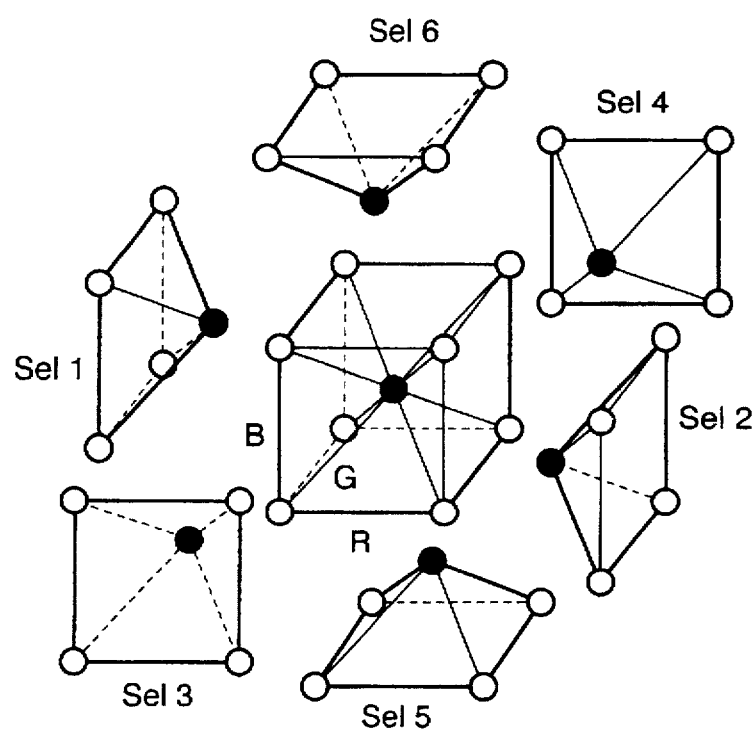
FIG. 7 is a diagram showing an example wherein six quadrangular pyramids are produced by using the vertexes of a unit cube and a point in the unit cube shown in FIG. 2.

For instance, when the minimum value MINL is BL, the quadrangular pyramid is determined as Sel5 shown in FIG. 7 according to Table 1. Lattice point data C11 to C14 can be represented as shown below according to expression (3):

$$C11=C1 (RU, GU, BU)$$

$$C12=C1(RU+1, GU, BU)$$

$$C13=C1(RU, GU+1, BU)$$

$$C14=C1(RU+1, GU+1, BU)$$

Then, lattice point data C21 closest to the input signal R, G, and B is read from a second table memory 72. Lattice point data C21 can be represented as follows according to expression (4):

$$C21=C2 (RU, GU, BU)$$

Figure 8:
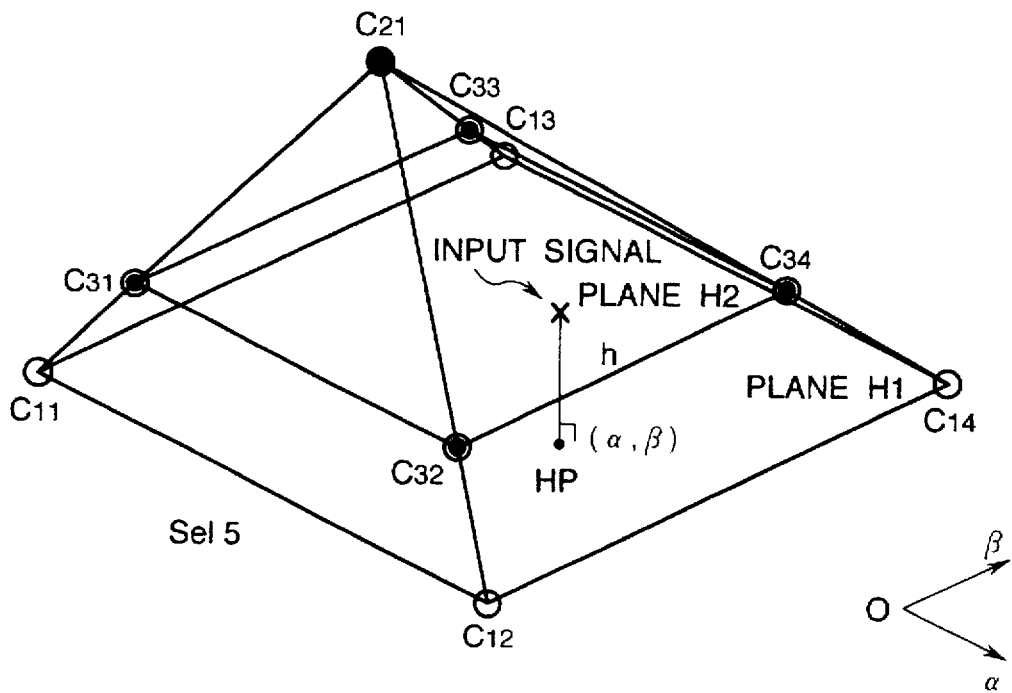
FIG. 8 is a diagram illustrating the method of interpolation in the quadrangular pyramid shown in FIG. 7.

A total of five lattice points C11 to C14, and C21 are obtained by following the procedures described above. The input signal of R, G, and B is located inside the quadrangular pyramid which is formed by the aforesaid five points, namely, C11 to C14 and C21, as illustrated in FIG. 8. The method of interpolation applied to the inside of the quadrangular pyramid consisting of the aforesaid five lattice points will now be described with reference to FIG. 6 and FIG. 8.

Figure 6:
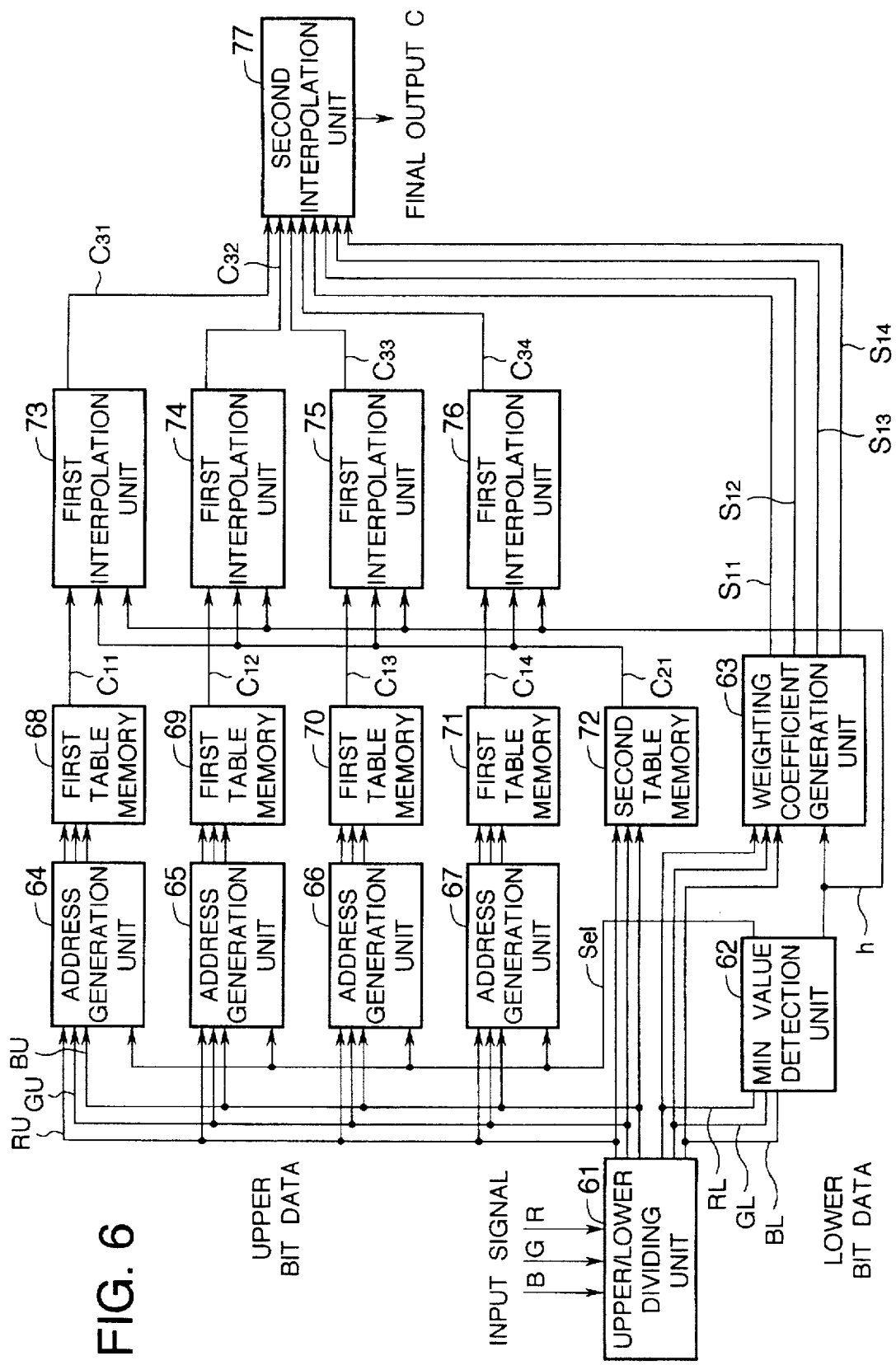
FIG. 6 is a block diagram showing the circuit construction of a second embodiment of the present invention.

Four points C31 to C34 of the vertexes of plane H2 including an input signal which is away from plane H1, which can be determined by C11 to C14 in FIG. 8, by distance h (determined by the min. value detection unit 62 of FIG. 6) are determined by carrying out interpolation based on the four points, namely, C11 to C14, and a point C21, through first interpolation units 73 to 76 shown in FIG. 6. For instance, C31 can be obtained according to the expression given below; C32, C33, and C34 can be obtained in the same manner.

$$C31=(h \times C21+(\delta-h) \times C11)/\delta$$

where $\delta=2^{NL}/2$; $h=MINL$ (10)

Figure 9:
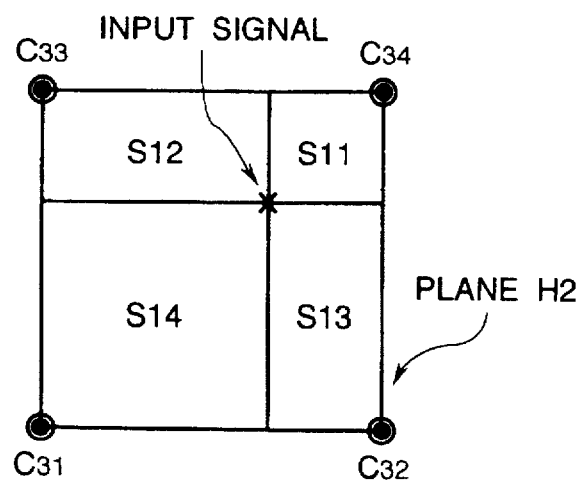
FIG. 9 is a diagram illustrating the method of interpolation using four points interpolated in the aforesaid quadrangular pyramid.
Figure 10:
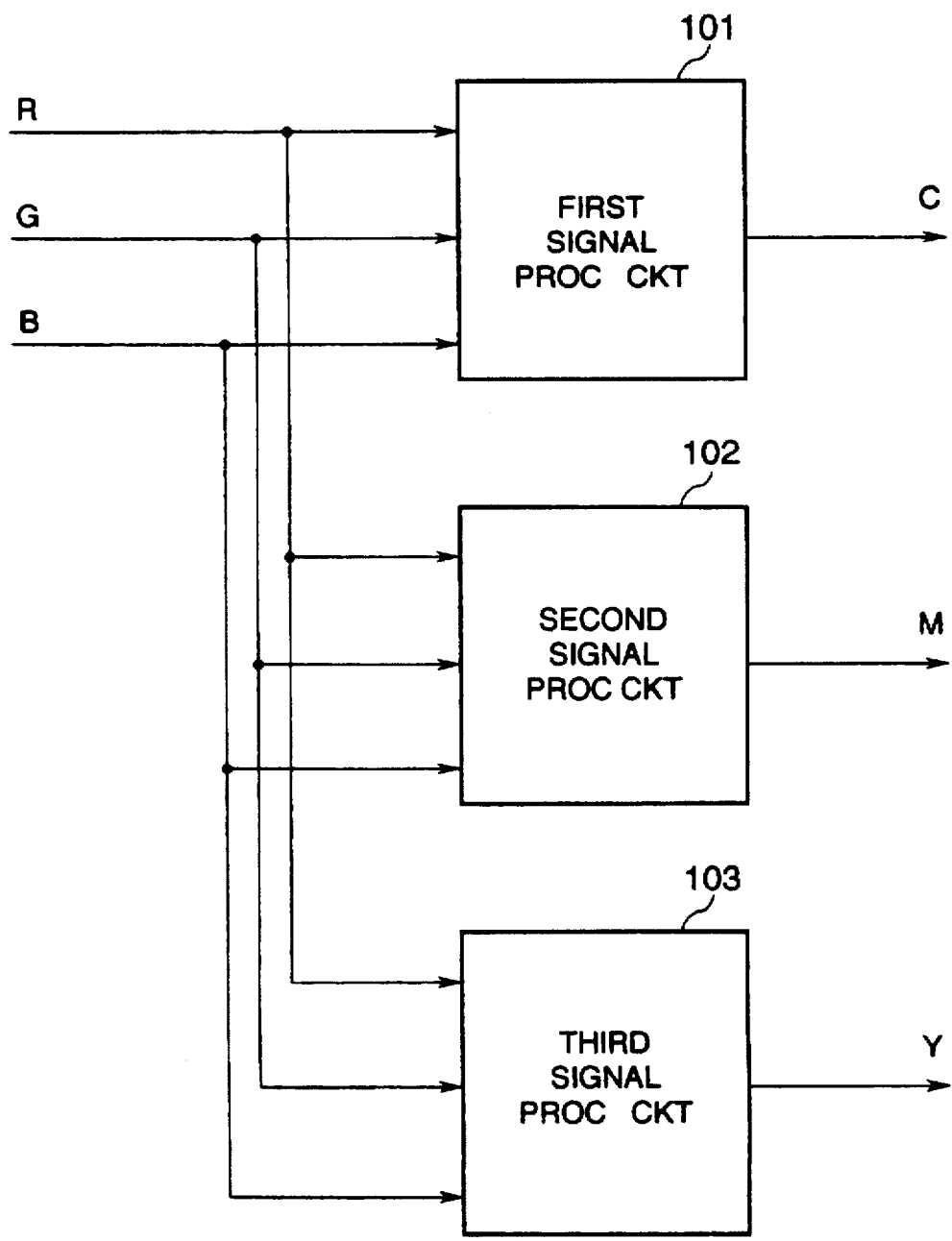
FIG. 10 is a block diagram showing the construction of a first conventional example.
Figure 11:
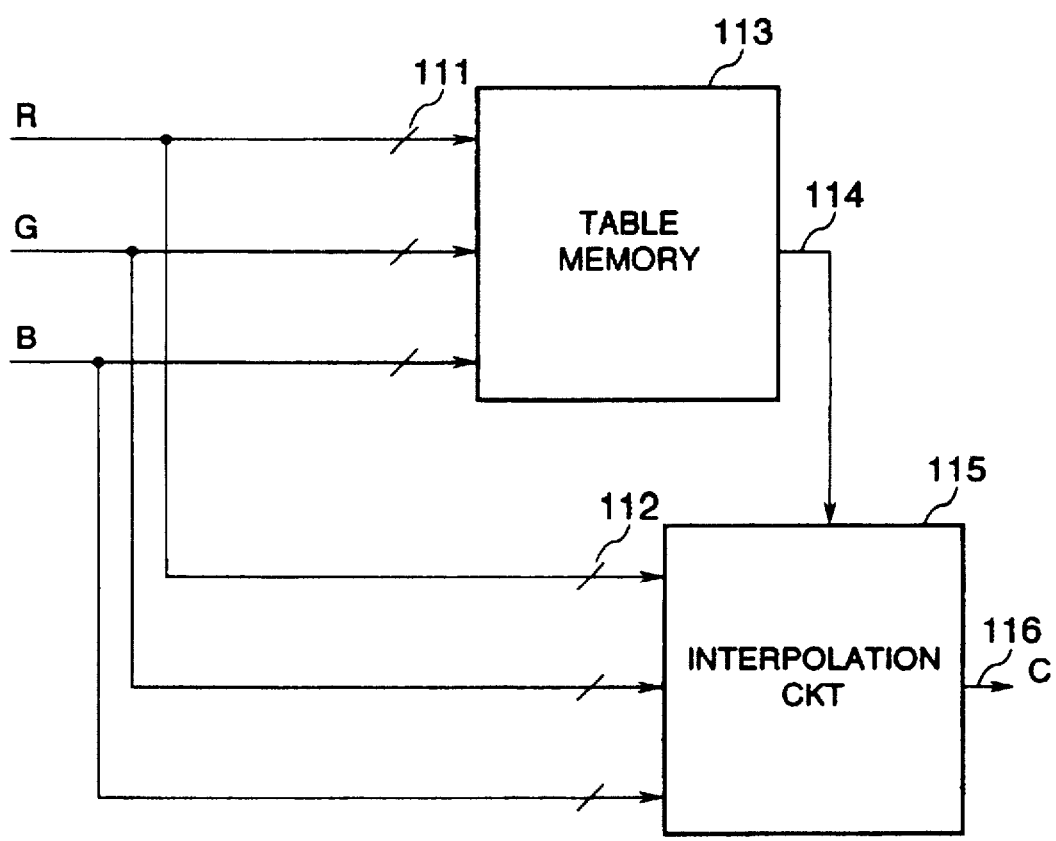
FIG. 11 is a block diagram showing the construction of a second conventional example.

Further, as shown in FIG. 9, a rectangle formed by C31 to C34 and four areas S11 to S14 obtained by dividing the rectangle by the input signal value are determined. Then, the determined area Sij can be used to carry out the interpolation through a second interpolation unit 77 shown in FIG. 6 by weighting the four vertexes C31 to C34 of the plane H2 by a weighting coefficient generation unit 63 shown in FIG. 6, thereby determining the final output signal C according to the expression given below.

$$C=S11 \times C31+S12 \times C32+S13 \times C33+S14 \times C34 \quad (11)$$

The following describes how to determine the four areas S11 to S14 of FIG. 9 by actually using the lower bit data RL, GL, and BL of an input signal value.

First, area S0 of plane H2 can be given by the following expression:

$$S0=(2^{NL}-2 \times h)^2$$

$$h=MINL \quad (12)$$

Areas S11 to S14 in plane H2 can be determined by coordinate HP ($\alpha$, $\beta$) of plane H1 according to expression (13) shown below. Coordinate HP ($\alpha$, $\beta$) of plane H1 can be determined from the lower bit of the input signal value. For instance, if the minimum value (MINL) is BL, then ($\alpha$, $\beta$)=(RL, GL).

$$S11=(2^{NL}-h-\alpha) \times (2^{NL}-h-\beta)/S0$$

$$S12=(\alpha-h) \times (2^{NL}-h-\beta)/S0$$

$$S13=(2^{NL}-h-\alpha) \times (\beta-h)/S0$$

$$S14=(\alpha-h) \times (\beta-h)/S0$$

$$h=MINL \quad (13)$$

(If S0=0, then
S11=1.0, S12=S13=S14=0.0)

In the above embodiment, areas S11 to S14 are determined by calculation for each interpolation; as a preferred alternative, computed values of the four values of S11 to S14 may be stored for all combinations of (h, $\alpha$, $\beta$) in memory beforehand, so that the memory is referred to for each interpolation.

In the above description, offset value $\delta$ is defined as $\delta=2^{NL}/2$; however, it is apparent that a different value may be used for obtaining the same result as in the embodiment described above.

Further, in the embodiment stated above, the description was given to the output value of only C (cyan) out of the output values Y, M, C, and K (yellow, magenta, cyan, and black) to simplify the description; however, the same procedures can obviously be used for the remaining Y, M, and K output values.

Furthermore, the input image signals are not limited to the image signals on the RGB space; they may be the image signals on other color spaces, including a homogenous color space such as L*a*b* space and L*u*v* space, XYZ color space, and CMYK color space.

As in the case of the input image signals, the output image signals may also be the ones on another color space.

Specifically, if the present invention is applied to an image processing apparatus which uses a monitor as the output device, for example, then the output image signals will be the image signals on the RGB color space.

If the present invention is applied to an image processing apparatus which employs an electrophotographic printer, which uses four color toners of C, M, Y, and K, then the output image signals will be the image signals on a CMYK color space based on the characteristics of the printer.

Likewise, the input image signals may be selected in accordance with an input device such as a scanner, camera, and host.

Thus, according to the present invention, the way data is stored depends on the input and output of a system to which the tables of this invention are applied.

Moreover, in the embodiment described above, the memory is divided into the first table memory and the second table memory. The present invention, however, is not restricted to this; all lattice points may be stored in a single memory.

Thus, according to the present invention, there is provided a color signal processing apparatus which is capable of ensuring satisfactory operation accuracy while keeping the memory size relatively small.

Furthermore, the interpolation accuracy for achromatic colors can be improved by defining $\delta$ as $2^{NL}/2$.

Although the preferred embodiments have been disclosed to describe the present invention, it is apparent that various other forms and modifications of the invention are possible within the scope of the attached claims.

What is claimed is:

1. An image processing apparatus comprising:
   storing means for storing first values corresponding to vertices of unit cubes and second values corresponding to intersections of diagonal lines of the unit cubes;
   reading means for reading out said first values and said second values in accordance with input data; and
   interpolating operation means for performing an interpolating operation in accordance with said read-out first values and said read-out second values.

2. An image processing apparatus according to claim 1, wherein said interpolating operation means carries out the interpolating operation by using five values of said first values and said second values.

3. An image processing apparatus according to claim 1, further comprising:
   dividing means which divides the input image data into upper bit data and lower bit data, and wherein said reading means reads said first values and said second value in accordance with an address based on the upper bit data, and said interpolating operation means carries out the interpolating operation in accordance with said first values and said second value and the lower bit data.

4. An image processing apparatus according to claim 1, wherein said input data is color image data, and said apparatus performs a color correction by using said storing means, said reading means and said interpolating means.

5. An image processing apparatus which generates an output color signal in accordance with an input color signal, comprising:

dividing means for dividing the input color signal into upper bit data and lower bit data;

first memory means for storing output values obtained by inputting the upper bit data as an address signal;

second memory means for storing output values for a signal value obtained as an address signal by adding a prescribed offset (where 0<the prescribed offset<the upper bit data) to a signal value expressed by the upper bit data of color components; and interpolating means for performing an interpolating operation on the basis of the output values of said first memory means corresponding to vertices of a cube having the upper bit data, the output value of said second memory means and the lower bit data, and for generating the output color signal.

6. An image processing apparatus according to claim 5, wherein the prescribed offset is a value which is half of a distinguishable minimum signal level step number in the upper bit data out of a signal level step number in which an input signal value can be expressed.

7. An image processing apparatus according to claim 5, wherein said interpolating means divides a unit cube determined by the upper bit data into six quadrangular pyramids defined by eight vertexes of the unit cube and one point inside the unit cube in a three-dimensional color space created by an input signal; said interpolating means comprising:

means for generating a quadrangular pyramid selecting signal for selecting one quadrangular pyramid, which is constituted by four vertexes of the unit cube and one point inside the unit cube so that it includes the input signal, among the six quadrangular pyramids; and means which issues four output values corresponding to four vertexes of the unit cube from said first memory means in response to the quadrangular pyramid selecting signal, and which issues an output value corresponding to one point inside the unit cube from said second memory means in accordance with the upper bit data, and which determines a final output value corresponding to the input signal, in accordance with a total of five output values for the vertexes of the selected quadrangular pyramid and the lower bit data.

8. An image processing apparatus according to claim 7, wherein said interpolating means has means for detecting minimum values of a total of six pieces of data, namely, three pieces of lower bit data of the respective input signals and three pieces of data obtained by subtracting said lower bit data from a distinguishable minimum signal level step number in the upper bit data out of a signal level step number in which an input signal value can be expressed when selecting one quadrangular pyramid out of the six quadrangular pyramids so that it includes the input signal; a quadrangular pyramid with data of the smallest value being selected among the six quadrangular pyramids.

9. An image processing apparatus according to claim 8, wherein said interpolating means carries out the interpolation in the selected quadrangular pyramid first by weighting, which is determined by the detected smallest value, using four points of the bottom surface of a quadrangular pyramid which correspond to four vertexes of the unit cube and a vertex of the quadrangular pyramid which corresponds to the center of gravity of the unit cube, then by carrying out linear interpolation on four points determined by the interpolation, thereby determining a final output value for an input signal value.

10. An image processing method comprising:

a storing step of storing first values corresponding to vertices of unit cubes and second values corresponding to intersections of diagonal lines of the unit cubes;

a reading step of reading out said first values and said second values in accordance with input data; and an interpolating operation step of performing an interpolating operation in accordance with said read-out first values and said read-out second values.

11. An image processing method which generates an output color signal in accordance with an input color signal, comprising:

a dividing step of dividing the input color signal into upper bit data and lower bit data;

a first memory step of storing output values given as an address signal for the upper bit data;

a second memory step of storing output values for a signal value obtained as an address signal by adding a prescribed offset (where 0<the prescribed offset<the upper bit data) to a signal value expressed by the upper bit data of color components; and an interpolating step of performing an interpolating operation on the basis of the output values corresponding to vertices of a cube having the upper bit data, the output value in said second memory step and the lower bit data, and for generating the output color signal.

* * * * *

UNITED STATES PATENT AND TRADEMARK OFFICE
CERTIFICATE OF CORRECTION

PATENT NO. : 5,768,410

DATED : June 16, 1998

INVENTOR(S): KENICHI OHTA ET AL.

It is certified that error appears in the above-identified patent and that said Letters Patent is hereby corrected as shown below:

COLUMN 1 line 28, "by an" should read --by--;
line 34, "$M=A_{11}xR+A_{22}xG+A_{23}xB$" should read --$M=A_{21}xR+A_{22}xG+A_{23}xB$--; and
line 60, "29" should read --$2^9$--.

COLUMN 2 line 7, "23" should read --$2^3$--;
line 19, "being" should read --using--; and
line 43, "the lattice" should read --lattice--.

COLUMN 3 line 53, "$B=BUx2^{NL}+BL_S$" should read --$B=BUx2^{NL}+BL$--.

COLUMN 4 line 11, "from0to $2^{NU}$" should read --from 0 to $2^{NU}$.--

UNITED STATES PATENT AND TRADEMARK OFFICE
CERTIFICATE OF CORRECTION

PATENT NO. : 5,768,410

DATED : June 16, 1998

INVENTOR(S) : KENICHI OHTA ET AL.

It is certified that error appears in the above-identified patent and that said Letters Patent is hereby corrected as shown below:

COLUMN 5 line 39, "8" should read --5--.

COLUMN 8 line 50, "second values" should read --a second value--;
line 53, "values" should read --value--;
line 56, "values." should read --value.--;
line 60, "values." should read --value.--; and
line 65, "and wherein" should read --and ¶ wherein--.

COLUMN 9 line 1, "and said" should read --and ¶ said--.

COLUMN 10 line 27, "second values" should read --a second value--;

UNITED STATES PATENT AND TRADEMARK OFFICE
CERTIFICATE OF CORRECTION

PATENT NO. : 5,768,410

DATED : June 16, 1998

INVENTOR(S) : KENICHI OHTA ET AL.

It is certified that error appears in the above-identified patent and that said Letters Patent is hereby corrected as shown below:

<u>COLUMN 10</u> continued

```
line 30,   "values" should read --value--; and
line 34,   "values." should read --value.--.
```

Signed and Sealed this

Fifteenth Day of May, 2001

Attest:

NICHOLAS P. GODICI

Attesting Officer    Acting Director of the United States Patent and Trademark Office